(12) United States Patent
Rankin et al.

(10) Patent No.: US 8,255,605 B2
(45) Date of Patent: *Aug. 28, 2012

(54) SCALABLE DISTRIBUTED MEMORY AND I/O MULTIPROCESSOR SYSTEM

(75) Inventors: Linda J. Rankin, Portland, OR (US); Paul R. Pierce, Portland, OR (US); Gregory E. Dermer, Portland, OR (US); Wen-Hann Wang, Shanghai (CN); Kai Cheng, Portland, OR (US); Richard H Hofsheier, Banks, OR (US); Nitin Y. Borkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,041

(22) Filed: Mar. 30, 2011

(65) Prior Publication Data
US 2011/0185101 A1 Jul. 28, 2011

Related U.S. Application Data

(63) Continuation of application No. 12/549,491, filed on Aug. 28, 2009, now Pat. No. 7,930,464, which is a continuation of application No. 12/013,595, filed on Jan. 14, 2008, now Pat. No. 7,603,508, which is a continuation of application No. 11/422,542, filed on Jun. 6, 2006, now Pat. No. 7,343,442, which is a continuation of application No. 09/569,100, filed on May 10, 2000, now Pat. No. 7,058,750.

(51) Int. Cl.
*G06F 13/00* (2006.01)
(52) U.S. Cl. ............................................. 710/306
(58) Field of Classification Search ............... 710/306, 710/313, 316
See application file for complete search history.

(56) References Cited

U.S. PATENT DOCUMENTS

| | | | |
|---|---|---|---|
| 4,014,005 A | 3/1977 | Fox et al. |
| 4,968,977 A | 11/1990 | Chinnaswamy et al. |
| 5,634,076 A | 5/1997 | Garde et al. |
| 5,708,849 A | 1/1998 | Coke et al. |
| 6,014,709 A | 1/2000 | Gulick et al. |
| 6,049,845 A | 4/2000 | Bauman et al. |

(Continued)

OTHER PUBLICATIONS

Non-Final Office Action mailed Aug. 22, 2002 for U.S. Appl. No. 09/569,100.

(Continued)

*Primary Examiner* — Glenn A Auve
(74) *Attorney, Agent, or Firm* — Blakely, Sokoloff, Taylor & Zafman LLP

(57) ABSTRACT

A multiprocessor system comprises at least one processing module, at least one I/O module, and an interconnect network to connect the at least one processing module with the at least one input/output module. In an example embodiment, the interconnect network comprises at least two bridges to send and receive transactions between the input/output modules and the processing module. The interconnect network further comprises at least two crossbar switches to route the transactions over a high bandwidth switch connection. Using embodiments of the interconnect network allows high bandwidth communication between processing modules and I/O modules. Standard processing module hardware can be used with the interconnect network without modifying the BICS or the operating system. Furthermore, using the interconnect network of embodiments of the present invention is non-invasive to the processor motherboard. The processor memory bus, clock, and reset logic all remain intact.

20 Claims, 4 Drawing Sheets

U.S. PATENT DOCUMENTS

| | | | |
|---|---|---|---|
| 6,108,738 | A | 8/2000 | Chambers et al. |
| 6,138,185 | A | 10/2000 | Nelson et al. |
| 6,154,794 | A | 11/2000 | Abdalla et al. |
| 6,167,489 | A | 12/2000 | Bauman et al. |
| 6,182,112 | B1 | 1/2001 | Malek et al. |
| 6,185,221 | B1 | 2/2001 | Aybay |
| 6,247,100 | B1 | 6/2001 | Drehmel et al. |
| 6,289,376 | B1 | 9/2001 | Taylor et al. |
| 6,292,705 | B1 | 9/2001 | Wang et al. |
| 6,314,501 | B1 | 11/2001 | Gulick et al. |
| 6,356,983 | B1 | 3/2002 | Parks |
| 6,415,424 | B1 | 7/2002 | Arimilli et al. |
| 6,490,585 | B1 | 12/2002 | Hanson et al. |
| 6,546,451 | B1 | 4/2003 | Venkataraman et al. |
| 6,549,691 | B1 | 4/2003 | Street et al. |
| 6,549,961 | B1 | 4/2003 | Kloth |
| 6,622,182 | B1 | 9/2003 | Miller et al. |
| 6,628,662 | B1 | 9/2003 | Blackmon et al. |
| 6,651,131 | B1 | 11/2003 | Chong, Jr. et al. |
| 6,665,761 | B1 | 12/2003 | Svenkeson et al. |
| 6,728,206 | B1 | 4/2004 | Carlson |
| 7,058,750 | B1 | 6/2006 | Rankin et al. |
| 7,206,869 | B2 | 4/2007 | Shishizuka et al. |
| 7,343,442 | B2 | 3/2008 | Rankin et al. |
| 7,603,508 | B2 * | 10/2009 | Rankin et al. ............ 710/317 |
| 7,930,464 | B2 * | 4/2011 | Rankin et al. ............ 710/317 |
| 2008/0114919 | A1 | 5/2008 | Rankin et al. |
| 2009/0319717 | A1 | 12/2009 | Rankin et al. |

OTHER PUBLICATIONS

Non-Final Office Action mailed May 15, 2003 for U.S. Appl. No. 09/569,100.
Final Office Action mailed Feb. 26, 2004 for U.S. Appl. No. 09/569,100.
Non-Final Office Action mailed May 31, 2005 for U.S. Appl. No. 09/569,100.
Notice of Allowance mailed Apr. 13, 2006 for U.S. Appl. No. 09/569,100.
Non-Final Office Action mailed Mar. 14, 2007 for U.S. Appl. No. 11/422,542.
Notice of Allowance mailed Jun. 14, 2007 for U.S. Appl. No. 11/422,542.
Notice of Allowance mailed Oct. 11, 2007 for U.S. Appl. No. 11/422,542.
Non-Final Office Action mailed Jul. 25, 2008 for U.S. Appl. No. 12/013,595.
Non-Final Office Action mailed Jan. 12, 2009 for U.S. Appl. No. 12/013,595.
Notice of Allowance mailed Jun. 1, 2009 for U.S. Appl. No. 12/013,595.
Non-Final Office Action mailed Aug. 18, 2010 for U.S. Appl. No. 12/549,491.
Notice of Allowance mailed Dec. 13, 2010 for U.S. Appl. No. 12/549,491.

* cited by examiner

SCALABLE DISTRIBUTED MEMORY AND I/O MULTIPROCESSOR SYSTEM

RELATED APPLICATIONS

This application is a continuation of U.S. application Ser. No. 12/549,491, filed on Aug. 28, 2009 now U.S. Pat. No. 7,930,464, which is a continuation of U.S. application Ser. No. 12/013,595, filed on Jan. 14, 2008, and issued as U.S. Pat. No. 7,603,508, which is a continuation of U.S. application Ser. No. 11/422,542, filed Jun. 6, 2006, now issued as U.S. Pat. No. 7,343,442, which is a continuation of U.S. application Ser. No. 09/569,100, filed May 10, 2000, now issued as U.S. Pat. No. 7,058,750, all of which are incorporated herein by reference in their entireties.

FIELD OF THE INVENTION

The present invention is related to multiprocessor computer systems, and more particularly to a scalable distributed memory and input/output multiprocessor system.

BACKGROUND INFORMATION

A computer system can be broken into three bask blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to in output device such as a printer, cathode-ray tube (CRT) display, digital-to-analog converter, LCD, etc.

In some computer systems multiple processors are utilized. Multiprocessor computers by definition contain multiple processors that can execute multiple parts of a computer program or multiple programs simultaneously. In general, this parallel computing executes computer programs faster than conventional single processor computers, such as personal computers (PCS) which execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Shared-memory multiprocessor computers may al so be classified by how the memory is physically organized. In distributed shared-memory computers, the memory is divided into modules physically placed near a group of processors. Although all of the memory modules are globally accessible, a processor can access memory placed nearby faster than memory placed remotely.

Multiprocessor computers with distributed shared-memory are often organized into nodes with one or more processors per node. Such nodes are also referred to herein as "processing modules." The processing modules interface with each other through a network by using a protocol. Companies, like Intel Corporation, have developed "chip sets" which may be located on each node to provide memory and I/O buses for the multiprocessor computers.

In some conventional distributed shared-memory multiprocessor system, input/output (I/O) modules are directly connected to the processing modules by a point-to-point bus. FIG. 1 is a block diagram of a processing module 102 coupled to one or more I/O modules 104 in a conventional multiprocessor system. The processing module 102 comprises one or more processors 108, a memory 110, and a memory controller 112. The memory controller 112 directs traffic between a system bus, one or more point-to-point buses 106 and the shared memory 110. The memory controller 112 accepts access requests from the system bus and directs those access requests to memory 110 or to one of the point-to-point buses 106. The memory controller 112 also accepts inbound requests from the point-to-point buses 106. As further shown in FIG. 1, each one of the I/O modules 104 comprises an I/O controller 114 and one or more I/O devices 116. Connections between the processing module 102 and the I/O modules 104 are via a point-to-point bus 106.

However, a convention multiprocessor system, such as the multiprocessor system shown in FIG. 1, has limited bandwidth to I/O devices. The need for high bandwidth connections to I/O devices in a distributed shared-memory system is increasing for many applications.

DESCRIPTION OF THE PREFERRED EMBODIMENTS

A novel scalable distributed memory and input/output (I/O) multiprocessor system is described. In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

As used herein, the phrase "some embodiments" refers to at least some embodiments of the invention. The various appearances of "some embodiments" are not necessarily referring to the same embodiments. If the specification states a component, feature, structure, or characteristic "may," "might," or "could" be included, that particular component, feature, structure, or characteristic is not required to be included. Reference in the specification to "an embodiment," "one embodiment" or "an example embodiment" means that a particular feature, structure, or characteristic described in connection with the embodiment is included in at least some embodiments, but not necessarily all embodiments, of the invention.

Figure 1:
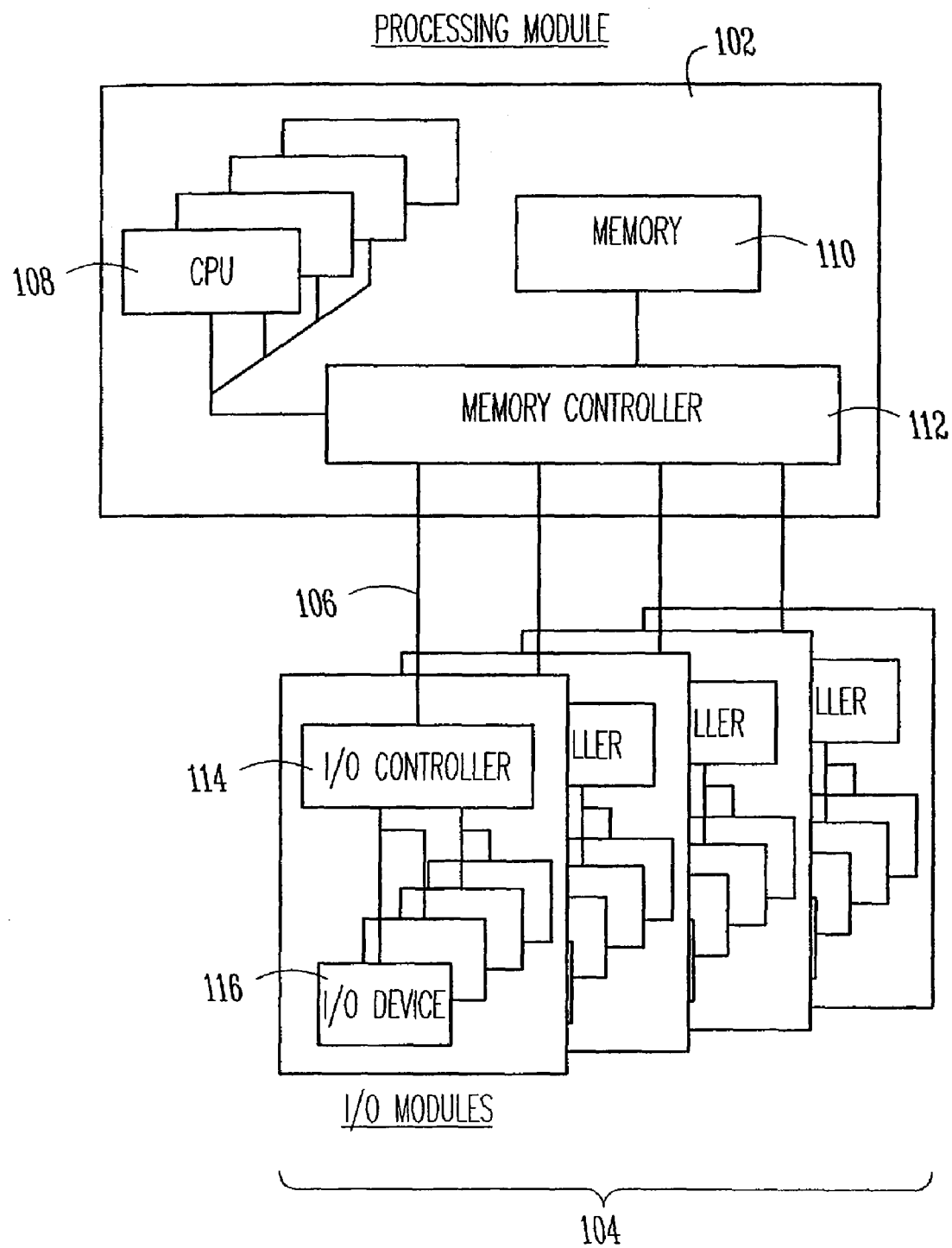
FIG. 1 is a block diagram of a processing module coupled to one or more I/O modules in a conventional multiprocessor system.

In conventional multiprocessor systems, such as the conventional system shown in FIG. 1, each one of the I/O modules are connected to the processing module by a point-to-point bus. However, in the novel scalable distributed memory and I/O multiprocessor system described below, one or more of the I/O modules are connected to the one or more processing modules by a novel interconnect network as shown in FIG. 2.

Figure 2:
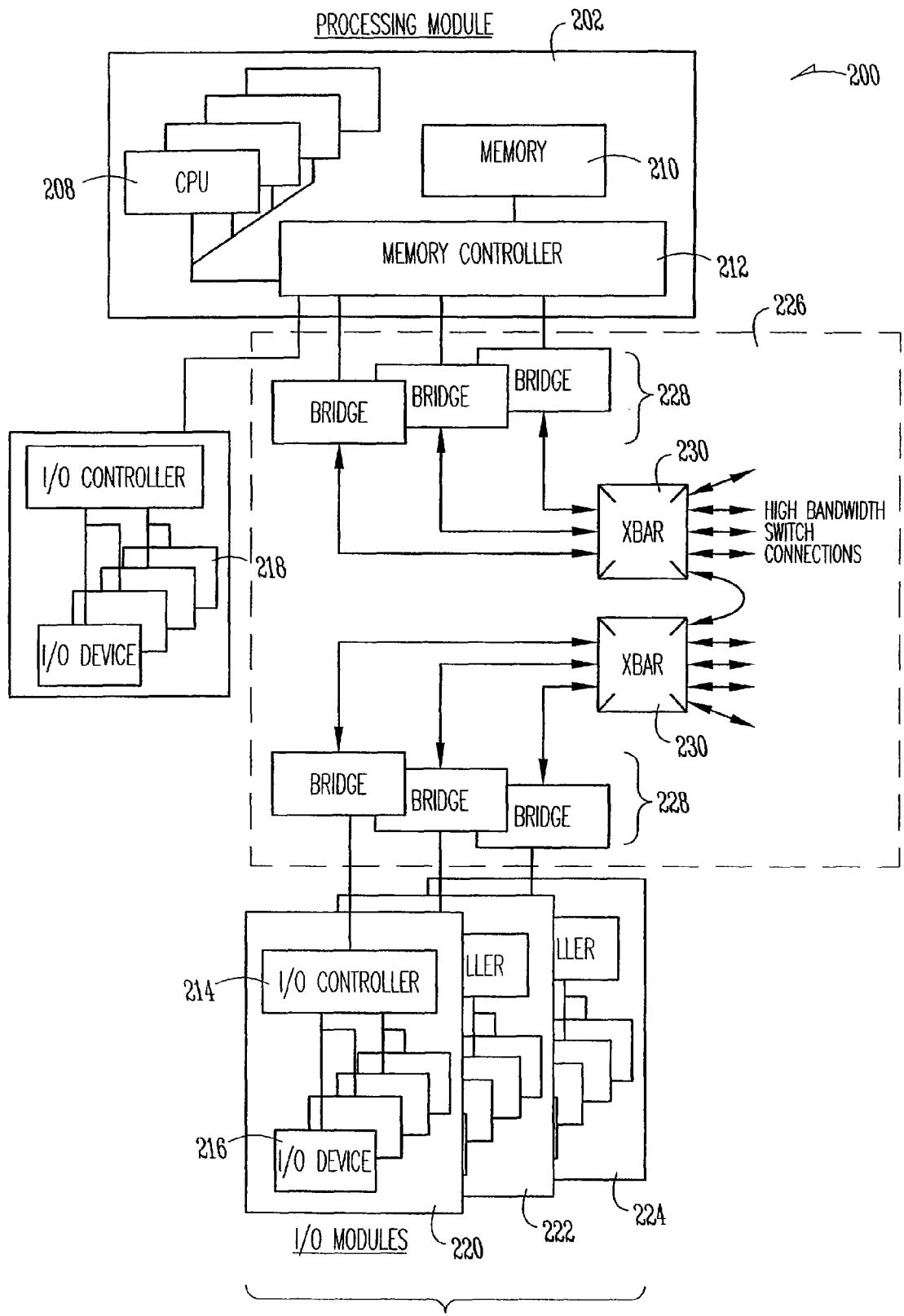
FIG. 2 is a block diagram of a processing module coupled to one or more I/O modules by a interconnect network according to one embodiment of the present invention.

FIG. 2 is a block diagram of a processing module coupled to one or more I/O modules by an interconnect network according to one embodiment of the present invention. A multiprocessor system 200, as shown in FIG. 2, comprises at least one processing module 202, at least one I/O module 204, and an interconnect network 226 to connect the at least one processing module 202 with the at least one input/output module 204. In an example embodiment, the interconnect network 226 comprises at least two bridges 228 to send and receive transactions between the input/output modules 204 and the processing module 202. The interconnect network 226 further comprises at least two crossbar switches ("Xbar") 230 to route the transactions over a high bandwidth switch connection (also referred to herein as a "X-Link").

Like the processing module 102 of FIG. 1, the processing module 202 of FIG. 2 also comprises one or more processors 208, a memory 210, and a memory controller 212. The multiprocessor system 200 of FIG. 2 also comprises one or more I/O modules 204 including an I/O controller 214 and one or more I/O devices 216. In the example embodiment shown in FIG. 2, a first one of the I/O modules 218 is directly coupled to the processing module 202 by a point-to-point bus. However, a second I/O module 220, a third I/O module 222 and a fourth I/O module 224 are coupled to the processing module 202 by an interconnect network 226 of one embodiment of the present invention.

In one embodiment, the interconnect network 226 comprises a plurality of bridges 228 and a plurality of crossbar switches 230. Each one of the bridges 228 performs several functions. In one embodiment, each one of the bridges 228 supports the protocol of the interface between the processing modules 202 and the I/O modules 204. In one embodiment the interface supported by the bridges 228 is a point-to-point bus protocol. Each one of the bridges 228 sends and receives transactions to and from the I/O modules 204 and the processing modules 202. Upon receiving a transaction from a processing module 202 or an I/O module 204, the bridge 228 determines the destination of the bus transaction through the use of route look-up tables. In one embodiment, the route look-up tables accommodate a memory mapped I/O organization. If the transaction is from a processing module 202 to an I/O module 204, the bridge 228 packetizes the transaction in a format that is compatible with the crossbar switch 230 and sends the packet to the I/O module 204. The bridge 228 that receives the packet from the crossbar switch 230 then returns the packet to the appropriate protocol format (such as a point-to-point connection bus protocol format).

In an example embodiment, each one of the crossbar switches 230 is a high bandwidth multiported non-blocking switch. In one embodiment, the number of ports on each one of the crossbar switches 230 and the size of the routing header of the packets determine the scalability limits of the system. The crossbar switches 230 can be configured in a variety of topologies. In one embodiment, the crossbar switches 230 are configured in a mesh topology. In one embodiment, the crossbar switches support independent power/on functions and reset functions. In one embodiment, a clock for each one of the crossbar switches 230 is independent of a clock for the processing modules.

Using embodiments of the interconnect network 226 allows high bandwidth communication between processing modules 202 and I/O modules 204. In previous systems, connectivity between processors and memory dominated, with access to I/O at the periphery of the system. Standard processing module hardware can be used with the interconnect network 226 without modifying the BIOS or the operating system. In one embodiment, drivers are added for boot and debug of the interconnect network 226. Furthermore, using the interconnect network 226 of embodiments of the present invention is non-invasive to the processor motherboard. The processor memory bus, clock, and reset logic all remain intact.

Figure 3:
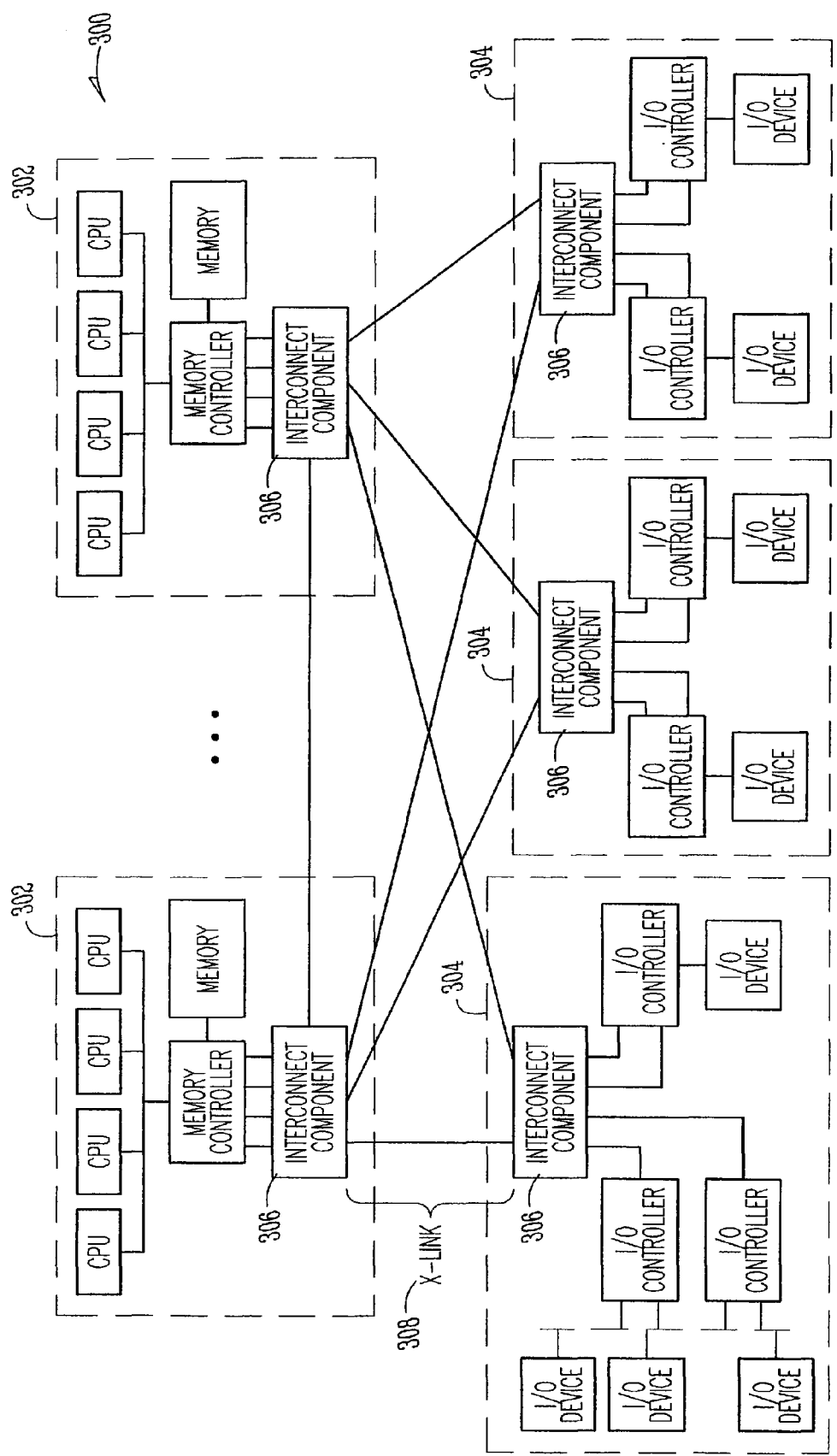
FIG. 3 is a block diagram of an alternate embodiment of a scalable distributed memory and I/O multiprocessor system of the present invention.

FIG. 3 is a block diagram of an alternate embodiment of a scalable distributed memory and I/O multiprocessor system 300 of the present invention. The multiprocessor system 300, as shown in FIG. 3, comprises at least one processing module 302, at least one input/output module 304, and at least one interconnect component 306. In the example embodiment shown in FIG. 3, the interconnect component is included in each one of the processing modules and each one of the input/output modules. However, the invention is not limited to the embodiment shown in FIG. 3. In alternate embodiments, the interconnect component 306 is separate from the processing module 302 and/or the input/output module 304. The multiprocessor system shown in FIG. 3 further includes a plurality of buses 308 communicatively coupling the interconnect components ("X-links").

The embodiment of a multiprocessor system 300 shown in FIG. 3 consists of multiple processing modules 302 and multiple input/output modules 304 interconnected through interconnect components 306 and X-links 308. In the example embodiment shown in FIG. 3, each processing module 302 consists of four processors ("CPU"), a shared memory, a memory controller, and one interconnect component 306. The interconnect component is connected to the memory controller by foul I/O buses. In the example embodiment shown in FIG. 3, each input/output module 304 consists of an interconnect component 306 and a combination of I/O controllers and I/O devices. Each IO controller is connected to the interconnect component 306 and to one or more I/O devices. Thus, with the interconnect component of embodiments of the present invention, it is possible to construct a system containing an application specific mix of processors, memory and IO resources.

The X-Link buses 308 between the interconnect components interconnect the processors, memory and IO. Several different interconnection topologies are possible even for this relatively simple example system.

Figure 4:
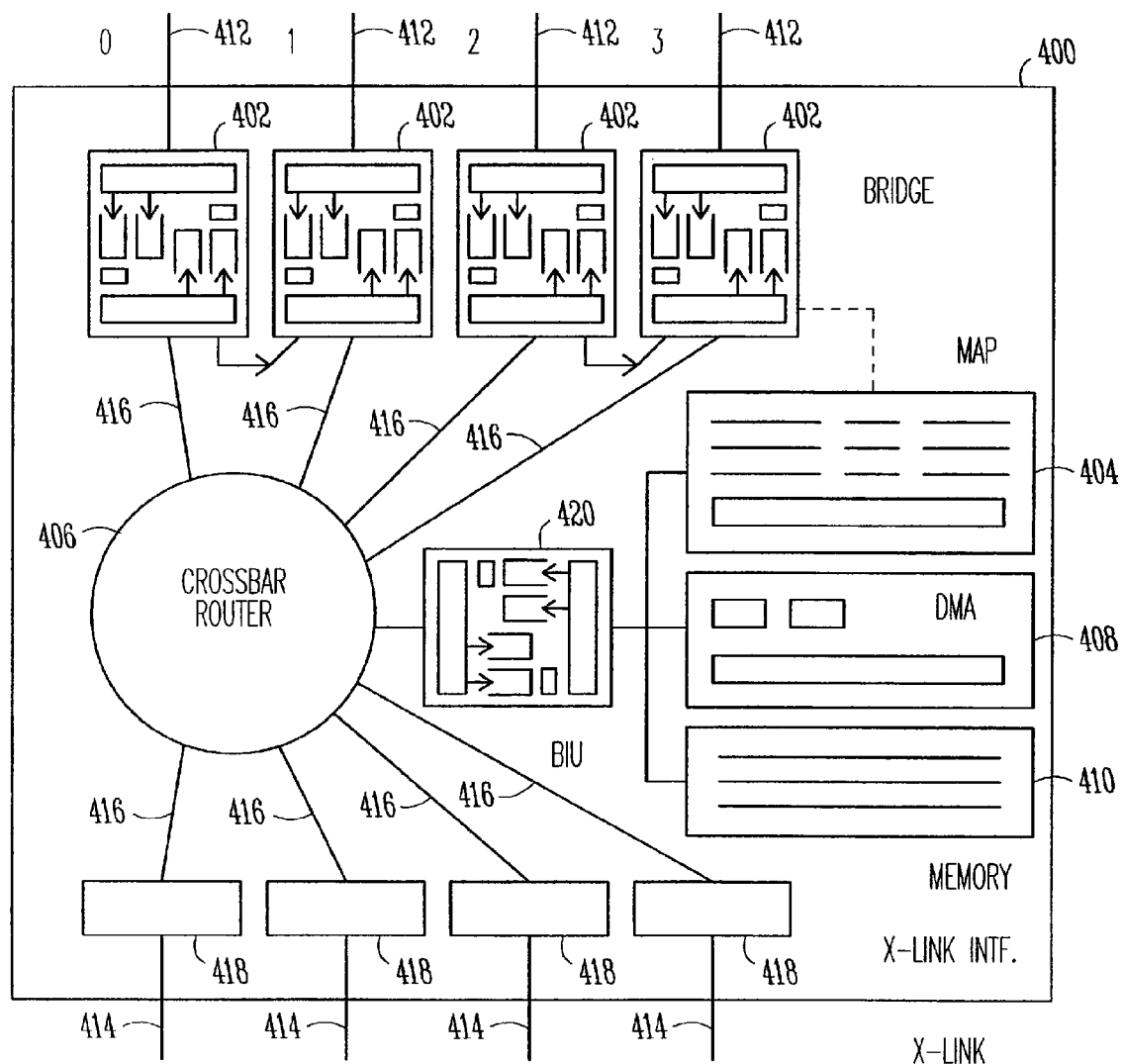
FIG. 4 is a more detailed block diagram of the logical architecture of an example embodiment of the interconnect component shown in FIG. 3.

FIG. 4 is a block diagram of the logical architecture of an example embodiment of the interconnect component 400 shown in FIG. 3. Logically the internal architecture consists of bridges 402, mapping registers 404, a crossbar router 406, DMA engines 408 and memory 410. The interconnect component 400 operates to bridge I/O and DMA requests between its point-to-point buses 412 and its external X-Link buses 414. Each of the point-to-point buses 412 has a bridge to an internal X-Link bus 416. The external X-Links 414 each have an interface 418 to an internal X-Link 416. One additional internal X-Link 416 connects through an internal bus interface unit (BIU) to the mapping registers 404 and DMA units 408. All the internal X-Links 416 connect to the crossbar router 406.

As shown in FIG. 4, there is a bridge 402 at each of the point-to-point buses 412. The bridge 402 provides an end point for the point-to-point bus 412. Each bridge 402 looks like a single PCI-like bus to the device on the other side of the point-to-point bus 412. Each bridge 402 manages queues of requests and data buffers, and passes requests and data through to and from an X-Link 414 coupled to the interconnect component 400. Each bridge 402 also contains an interface to the point-to-point bus 412 which interfaces to the external signals, tracks the bus state and directs request and completion messages to and from the proper queues. In one embodiment, there are two queues in each direction, one for requests and one for completions. On the point-to-point bus side of each queue, queue slots are allocated and tracked according to the rules of the point-to-point bus. The bridge 402 appears as a single end point for incoming messages. On the internal X-Link side of each queue allocation of queue slots and data buffers for incoming requests is on a first come, first served basis. In one embodiment, flow control is by back pressure through the network. Each bridge 402 also contains a number of data buffers which temporarily hold all the data associated with a write request or read completion. As with the queues, the buffers are managed according to the point-to-point bus rules on that side and the X-Link rules on the other. Each bridge 402 contains an interface to an internal form of the X-Link. The interface manages its end of the queues and data buffers. The interface also maps (using the mapping registers described below) requests from the point-to-point bus to route them through the proper X-Links. In one embodiment, the interface uses a point-to-point bus transaction ID field to keep track of requests and their matching completions, holding the old transaction ID and route in a local buffer array.

In the example embodiment shown in FIG. 4, the interconnect component 400 has mapping registers 404 to cover all of the many possible memory and IO buses in the system. Each mapping register 404 associates a range of memory addresses with an X-Link route field and lane. In operation, each bridge 402 has access to the mapping registers 404 to obtain the route and lane needed to convert point-to-point requests into X-Link requests. In one embodiment, the BIOS sets up the mapping registers 404 at boot time. There is read/write access to all of the mapping registers 404 through the internal BIU. On reset one set of mapping registers 404 is initialized to allow access to the internal BIU from at least one of the point-to-point buses 412. In one embodiment, the BIOS enumerates all of the buses in the system, assigning each a contiguous address range, and maps them the same for all processors. If a special case is needed for one of the point-to-point buses for booting, the various boot buses will be mapped separately. In one embodiment, the BIOS also creates a special mapping for all of the memory in the system. In one embodiment, within each processing module, memory is physically present starting at address 0 with a standard memory layout. In one embodiment, for remote access the BIOS assigns an additional unique address range in high physical address space for each memory. The standard low map is only available locally within the processing module and processors can map it cacheable. The unique high map is available across the system. High map addresses match a mapping register which contains the information needed to remap the address to the low range. In one embodiment, the memory controller never sees high map addresses, only the standard low address memory layout.

In one embodiment, the X-Links 414 use the same kind of reversible source routing mechanism as the point-to-point bus but with a lager route field to handle many more possible destinations. Once a route is assigned to a message, the message can pass through several interconnect components 400 to reach its destination. At each hop a few bits of the route are used to determine where it should go next and the route field is rotated to present new bits for the next hop. At the end the resulting route field is bit-reversed and complemented to yield a reverse route back to the source of the request.

As shown in FIG. 4, each interconnect component 400 has a crossbar router 406 which connects all the internal units of the interconnect component via internal X-Links 416. In one embodiment, the crossbar router 406 supports multiple virtual channels or lanes on each X-Link. The crossbar router 406 is capable of passing messages across several non-interfering paths simultaneously at full X-Link bandwidth. The crossbar router 406 manages arbitration and flow control for the interconnect component 400. When a message arrives on an entrance port the crossbar router 406 examines a few bits of the route to determine the exit port. It arbitrates for the exit port and lane and provides some minimal queuing. Until arbitration succeeds it exerts back pressure on the entrance port to provide flow control.

In one embodiment, the interconnect component shown in FIG. 4 can support isochronous traffic by providing a duplicate high priority set of lanes and buffers. All traffic on the priority path has precedence over regular traffic. Ideally priority traffic would be identified as it enters the interconnect component on the point-to-point bus through a bit in the packet or other means supported by the chipset. Without support in the chipset for isochronous traffic it is be identified by the lane designation in the mapping registers. All traffic on the priority lanes must first request to be registered with bandwidth management software. This software allocates routes and bandwidth so that isochronous traffic flows through its priority lanes without congestion. If the software is unable to allocate enough bandwidth or find a non-conflicting route the request is denied.

As shown in FIG. 4, each X-Link interface 418 implements one high bandwidth external X-Link 414. Each X-Link interface 418 connects to the crossbar router 406 via an equivalent internal X-Link 416. The X-Link interface 418 drives and receives external X-Link signals and converts to the form of the internal X-Link.

In the example embodiment shown in FIG. 4, the interconnect component 400 contains a small number of specialized DMA memory-memory copy engines 408 which facilitate message passing between the processing modules. Because the interconnect component 400 interconnects memories at I/O level in the system, it does not maintain coherence between separate memories in one embodiment. Without the DMA engines 408, the most effective way for a processor to communicate with a processor in another processing module is to copy the data itself. This adds the message passing bandwidth twice (once to read, once to write) on the processor bus of the processor doing the copy. With the DMA engines 408 a copy can be completed directly between the memories through the IO system without placing data on either processor bus. This helps maintain the bandwidth balance of the system. The DMA engines 408 are configured and initiated through the internal BIU. They can operate in several similar modes for different types of message passing. They may also be useful for generating arbitrary requests for testing and debugging.

If the X-Link includes architectural features to support isochronous traffic it is likely that the traffic is generated through the DMA engines 408. Thus in that case the DMA engines also include features to identify isochronous transfers and control bandwidth allocation on the X-Links. In operation a DMA engine 408 generates memory read requests. When the read completions arrive they turn into memory write requests with a different memory address. An operation is finished when all the write completions arrive.

The internal BIU 420 provides direct access to the interconnect component for all kinds of configuration and for operation of the DMA engines. It appears as a PCI device with standard PCI configuration space registers. It contains inbound and outbound request and completion queues (like the I/O controller and bridge) to serve as an endpoint for requests as if it interfaced to a PCI bus connected to a single PCI device. The BIU presents a small memory address space with areas set aside for general interconnect component configuration registers, the mapping registers, the DMA engines and the buffer memory.

In one embodiment, the point-to-point buses 412 on a particular interconnect component 400 each have an individual clock derived from a common clock. Interconnect components 400 connected to the memory controller on a processing module receive the clock from the chipset's point-to-point bus clock driver. Interconnect components connected to an JO subsystem generate a clock for the point-to-point clock driver. There are many ways to handle the Interconnect component core clock, X-Link bus clocks and system clock distribution. Because each processing module has its own clock the interconnect component 400 contains at least one clock domain crossing somewhere.

The Interconnect component 400 has a reset input which initiates normal power-on reset functions. There is a reset output derived from a register in the BTU which can be used to remote control and coordinate reset in an IO subsystem or subsidiary processing module. In one embodiment, the chip can be configured so that this reset signal is coordinated with reset functions of the point-to-point bus without affecting the rest of the chip.

In the example embodiment shown in FIG. 4, the X-Link is a novel, narrow, very high-bandwidth bus using simultaneous bidirectional signaling. The X-Link uses low voltage simultaneous bidirectional signaling. Information is clocked by source synchronous clocks in each direction. The bus protocol on the X-Link encapsulates the point-to-point bus protocol and performs the same basic function. In one embodiment, deadlock prevention is achieved through careful design of a system topology and selective use of the available routes along with hardware support in the form of at least two virtual channels or lanes per link. Flow control is achieved by link level back pressure per lane. In one embodiment, the X-Link protocol supports isochronous traffic through bandwidth allocation on a set of priority lanes. Traffic in the priority channels is allocated on a relatively long term basis by system software, which ensures that the bandwidth of generated traffic does not exceed the allocation through features in the DMA engines. Unused bandwidth is automatically available for regular traffic on the non-priority channels.

To illustrate the operation of the interconnect component shown in FIG. 4, an example request through the multiprocessor system is described below. In this example, a DMA read cycle from an I/O device in an IO module to memory on one of the processor/memory nodes is received. The converts it into a point-to-point bus request message. The request enters the first interconnect component on the point-to-point bus and is queued in an inbound request queue in the bridge. A data buffer is allocated for the eventual completion message. When it reaches the head of the queue the bridge looks up the address in the mapping registers to obtain a route through the system and converts the request to an internal X-Link request message. The request enters the crossbar router which uses some bits of the route field to forward it out on another X-Link. Since this is a memory request, it will be routed to one of the external X-Link interfaces. The X-Link interface drives the request message across one of the X-Links towards the Interconnect component connected to the processing module.

The request enters a second interconnect component on one of its X-Links and the X-Link interface forwards it to the crossbar router. The crossbar router uses some more bits of the route and forwards the request message out another internal X-Link to one of the bridges. The bridge converts the request message back to an point-to-point bus request and queues it in an outbound request queue. The bridge converts the route to a return route, upgrades the lane, and allocates a data buffer. This information is stored for future use by the completion message. When the request reaches the head of the queue the bridge sends it across the point-to-point bus.

The request is received by a memory controller which performs the memory access and generates a completion message with data. The memory controller sends the completion across the point-to-point bus to the second interconnect component. The completion enters the second interconnect component on the point-to-point bus and is queued in an inbound completion queue in the point-to-point bus. The bridge finds the data buffer for the data. When the completion reaches the head of the queue the bridge converts it to an X-Link completion message using the return route stored from the request and forwards it along its internal X-Link to the crossbar router. It then deallocates the queue slots and data buffer associated with the request. The completion message with its data follows the reverse path through the second interconnect component crossbar router, X-Link interface, X-Link to the first interconnect component, X-Link interface through crossbar router to the original bridge in the first Interconnect component.

The bridge converts the completion back to an point-to-point bus message and stores it in an outbound completion queue, placing the data in the preallocated data buffer. When the completion reaches the head of the queue the bridge sends it across the point-to-point bus and deallocates queue and data buffer resources. The I/O controller accepts the data and presents it on the PCI bus according to PCI bus protocol, including proper handling of bus timeout and retry.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A multiprocessor system comprising:
   at least one processing module including at least one processor, a memory, and a memory controller; and
   an interconnect network for coupling to the at least one processing module, the interconnect network comprising:
   at least two bridges to send and receive transactions from at least one input/output module and the processing module; and
   at least two crossbar switches to route the transactions over a bus between the at least two bridges.

2. The multiprocessor system of claim 1, wherein the at least two bridges support a point-to-point protocol.

3. The multiprocessor system of claim 2, wherein the at least two bridges manage the translation of the point-to-point protocol to a protocol of the interconnect network.

4. The multiprocessor system of claim 1, wherein the at least two crossbar switches are multi-ported non-blocking switches that comprise ports.

5. The multiprocessor system of claim 4, wherein the at least two crossbar switches support independent power/on and reset of the ports.

6. The multiprocessor system of claim 1, wherein a clock for the at least two crossbar switches has a source that is independent of a clock for the processing modules.

7. The multiprocessor system of claim 1, wherein the at least one processing module includes four processors.

8. The multiprocessor system of claim 1 further comprises:
an input/output module directly coupled to the processing module by a point-to-point bus.

9. The multiprocessor system of claim 1, wherein the at least two crossbar switches are configured in a mesh topology.

10. A multiprocessor system comprising:
at least one processing module including at least one processor, a memory, and a memory controller;
at least one input/output module;
one or more buses to communicatively couple the at least one processing module and the at least one input/output module; and
at least one interconnect component coupled to each one of the processing module and the input/output module, the interconnect component to support the protocol of the one or more buses between the processing module and the input/output module.

11. The multiprocessor system of claim 10, wherein the at least one interconnect component is included in the at least one processing module.

12. The multiprocessor system of claim 10, wherein the at least one interconnect component is included in the at least one input/output module.

13. The multiprocessor system of claim 10, wherein the at least one interconnect component comprises at least one bridge and a crossbar router.

14. The multiprocessor system of claim 10, wherein the at least one interconnect component manages the translation of a point-to-point protocol to a protocol of the one or more buses.

15. The multiprocessor system of claim 10, wherein the at least one processing module includes four processors.

16. The multiprocessor system of claim 10, wherein the memory is a shared memory.

17. An integrated circuit comprising:
a crossbar router;
a bridge communicatively coupled to the crossbar router, the bridge to packetize transactions between a processing module and an input/output (I/O) module in a format that is compatible with the crossbar router; and
at least one Direct Memory Access (DMA) engine coupled to the crossbar router.

18. The integrated circuit of claim 17 further comprising:
a plurality of mapping registers communicatively coupled to the bridge, wherein the mapping registers to provide routing information for the bridge.

19. The integrated circuit of claim 18, wherein the plurality of mapping registers are operable to be set at boot time.

20. The integrated circuit of claim 17, wherein the bridge is coupled to a point-to-point bus.

* * * * *